Patented Aug. 4, 1936

2,049,525

UNITED STATES PATENT OFFICE 2,049,525

FERTILIZER BASE MATERIAL

Albert G. Stillwell, Cos Cob, Conn.

No Drawing. Application March 30, 1934,
Serial No. 718,211

10 Claims. (Cl. 71—9)

This invention relates to non-hygroscopic fertilizers and a method for producing same.

The invention also relates to a method of utilizing extensively produced by-product materials containing plant nutrient elements which materials are generally discarded as waste products having no value and transforming such waste materials cheaply into very valuable products capable of wide commercial and practical use.

Further, the invention relates to a method of making fertilizers and more particularly a non-hygroscopic fertilizer base containing highly valuable nitrogen, potash and other plant nutrients, the relative amounts of which may be predetermined and accurately controlled within wide limits.

More specifically, the invention relates to non-hygroscopic fertilizers containing the valuable plant nutrients hereinbefore mentioned and a method for making such fertilizers from solutions containing organic matter such as, for example, waste liquor produced in the manufacture of cane or beet sugar from molasses and in the manufacture of alcohols or the like and other solutions containing organic bodies having like characteristics or containing plant food elements. These liquors or desidua are hereinafter sometimes referred to as slop.

This application is a continuation-in-part of my application, Serial No. 685,740, in which I described inter alia a method of making what might be termed a complete fertilizer. While the materials and method therein described are efficacious, it sometimes happens that the sources of the raw materials are divergent. In such case it may be economically desirable to treat the hygroscopic slop at its source of production whereby to render it available in non-hygroscopic and granular form. It may then be conveniently stored or transported, later to be combined with other fertilizer elements to produce finished products of predetermined characteristics.

The invention consists in treating waste liquor or other solutions having intermixed therewith organic acids and other organic materials containing plant nutrients with a chemically reactive substance by which treatment the otherwise hygroscopic constituents may be transformed into non-hygroscopic compounds containing nitrogen and potash available as fertilizer.

Further, the invention consists in producing a non-hygroscopic fertilizer base material containing a relatively large amount of water-insoluble nitrogen available in organic form in addition to the potash of the slop. This base material is rendered granular in form and is suitable for compounding with other fertilizer material to make a completed fertilizer.

The invention also consists in forming a product having the general characteristics, the new and useful applications, and the several features of utility hereinafter set forth and claimed.

Also, the invention consists in the new and novel features of operation and the new and original arrangements and combinations of steps in the process hereinafter described and more particularly set forth in the claims.

The following more particular description is given for purposes of illustration and explanation but it will be understood that the details may be modified in various respects without departure from the broad aspect of the invention.

The waste liquor or slop resulting from the distillation process in the manufacture of alcohol from molasses contains highly valuable plant nutrients such as nitrogen and potash compounds but they are in such form as to be very hygroscopic and even when dried in such form absorb water again becoming sticky and unfit for convenient use as fertilizer.

To render these hygroscopic plant nutrient containing compounds available in a non-hygroscopic form and to produce a fertilizer base material, I reduce the slop to a specific gravity of about 32° to 42° Bé. Although other concentrations may be used, I have found the desirable limits to be those set forth.

To a ton of this concentrated slop is added from 1400 lbs. to 2000 lbs. of calcium cyanamid. The amount will vary, depending upon the kind of slop and the amount of water it contains. The proper quantity, however, may be easily determined empirically, the important consideration being to add sufficient cyanamid which upon intermixture with the slop at a temperature of approximately 130° F. will produce a granular product.

For example, if the slop contains less than 30% water, 70% to 100% of the weight of the slop will be the amount of calcium cyanamid required and when mixed under proper conditions the resulting product will not require drying. The water of the slop combines as water of crystallization and a granular mass which is hard and non-hygroscopic results. The slop and cyanamid may be heated separately or together to 130° F. which appears to be the most suitable temperature. Intimate intermixing is desirable. The granular or crystalline product thus formed is sufficiently hard to be ground.

While a non-hygroscopic product may be produced at lower temperatures the resultant mass is not granular but tough and leathery. On the other hand, the reaction may be carried out at a higher temperature. The higher temperatures will produce a granular product, but it is undesirable to carry out the reaction above 212° F. lest the valuable organic constituents of the slop be substantially destroyed. Particularly important is the formation of a granular product which is crystalline, hard and capable of being ground. If, however, too much water is present in the granular product, it may be removed by natural or artificial drying.

In the example given, approximately 50% of the nitrogen of the cyanamid is converted into some other form. Apparently it combines with the organic matter of the slop in the form of organic nitrogen. The nitrogen of the cyanamid is over 90% water-soluble. When it is mixed with the slop as described, approximately 50% of its nitrogen content is rendered water-insoluble. This water-insoluble nitrogen is found to be between 90% and 95% "available" by the neutral permanganate method, thus indicating it is in the organic form.

The amount of calcium cyanamid added will determine to a large extent the amount of nitrogen in the resulting granular mass. It will be apparent, however, that economic factors as well as the chemical factors will determine the amount of cyanamid to be added.

The granular product thus produced, containing relatively large quantities of nitrogen in both water-soluble and available water-insoluble form together with the potash of the original slop, may be ground. It may then be compounded with other fertilizer materials, such as, for example, super phosphate, potash salts or other materials containing plant nutrients. The base material may be thus compounded with other materials to make up a fertilizer to meet particular specifications.

While a specific example of a preferred procedure has been described, it is not intended so to confine the invention, as it will be apparent that waste liquor or slop from alcohol distilleries or molasses desugarizing plants either using beets or cane, as well as other solutions of like characteristics may be used as a raw material in the process contemplated by the invention. Various percentages of calcium cyanamid may be used and I have found that either the crude or refined is suitable. Or, if desired, other substances may be utilized to react with the slop to render the product granular and non-hygroscopic, such as, for example, caustic, or hydrated lime, urea or salts from which ammonia may be liberated. The cyanamid is, however, particularly suitable because of its nitrogen content, a large part of which combines as organic nitrogen in the fertilizer materials. It will be apparent, however, that economic considerations enter the problem when the slop is treated on a commercial scale. Often the major object is to render the slop granular and non-hygroscopic without particular reference to the nitrogen content. Then, any substance which will react chemically with the slop to render the product of the reaction crystalline or granular may be substituted for the cyanamid.

It is seen from the foregoing description that a waste product now generally discarded may be utilized in a very practical and economical manner which not only produces fertilizer but which may have a very material effect on potash conservation. In addition to conservation of materials which might otherwise be discarded and thrown away, the invention contemplates a method for producing a non-hygroscopic fertilizer base material containing relatively large quantities of available water-insoluble nitrogen and potash. From this base, fertilizer to meet particular specifications may be made by compounding it with other plant food products. Furthermore, the process is one in which the temperature may be maintained sufficiently low to prevent the destruction of desirable organic compounds which is likely to follow where extreme heat is employed. Still further, the cost of manufacture of a complete fertilizer using slop as a raw material may in many cases be considerably lessened.

While certain novel features of the invention have been disclosed and are pointed out in the annexed claims, it will be understood that various omissions, substitutions and changes may be made by those skilled in the art without departing from the spirit of the invention.

What is claimed is:

1. The method of making a fertilizer base material from the residuum of alcohol distillation processes which comprises mixing said residuum with a cyanamid-containing substance at a temperature above 130° F. and below 212° F. whereby to produce a non-hygroscopic granular product containing appreciable quantities of available water-insoluble nitrogen.

2. A method of producing a fertilizer material which comprises converting hygroscopic slop from alcohol distillation processes in liquid form into a non-hygroscopic granular product, said conversion being effected by mixing said slop with calcium cyanamid in the approximate ratio of a ton of slop reduced to a specific gravity of 32° Bé. to 42° Bé. to 1400 lbs. of cyanamid.

3. A method of producing a fertilizer material which comprises converting hygroscopic slop at a temperature of about 130° F. in liquid form into a non-hygroscopic product in granular form, said conversion being effected by mixing said slop with calcium cyanamid in the following proportions: 1400 lbs. to 2000 lbs. of calcium cyanamid to a ton of said slop having a specific gravity of from 32° Bé. to 42° Bé.

4. A method of producing a fertilizer material which comprises converting hygroscopic alcohol refinery slop in liquid form into a non-hygroscopic product in granular form, said conversion being effected by mixing said slop with calcium cyanamid at a temperature of approximately 130° F. in the ratio of 2 of said slop at approximately 42° Bé. to 1,4-2 of cyanamid by weight whereby to change approximately 50% of the nitrogen content of said cyanamid to the active water-insoluble form.

5. A method of producing a fertilizer material which comprises converting hygroscopic alcohol refinery slop in liquid form into a non-hygroscopic product in granular form, said conversion being effected by mixing said slop reduced to 32° to 42° Bé. with calcium cyanamid at a temperature between 120° F. and 212° F. whereby to change appreciable quantities of water-soluble nitrogen of the cyanamid to organic-water-insoluble form, sufficient cyanamid being added to render the product hard and crystalline without artificial drying.

6. A method of producing a fertilizer material which comprises reducing the liquid residuum from an alcohol distillation process to a specific gravity of from 32° Bé. to 42° Bé., mixing commercial calcium cyanamid with said residuum in the ratio of 14 to 20 parts cyanamid to 20 parts by weight of residuum while simultaneously maintaining the mixture at a temperature about 130° F. sufficient time for the completion of the chemical reaction between said residuum and cyanamid, the quantity of cyanamid added being determined by the amount required to produce a hard, crystalline, granular product containing no less than 90% of its nitrogen content as available insoluble nitrogen by the neutral permanganate method.

7. A method of producing a fertilizer material by the utilization of the hygroscopic waste liquor produced in the manufacture of cane or beet sugar from molasses and in the manufacture of alcohols or the like, known as slop, which comprises converting said hygroscopic slop in liquid form into a non-hygroscopic product in granular form, said conversion being effected by mixing said slop reduced to a specific gravity of 32° to 42° Bé. with calcium cyanamid, at a temperature above 130 F. whereby to avoid the formation of a tough leathery mass and below 212° F. whereby to avoid substantial destruction of the organic plant nutrients of the slop.

8. A method of producing a fertilizer material from the waste liquors produced in the manufacture of cane or beet sugar from molasses and in the manufacture of alcohols or the like, known as slop, which comprises mixing said slop with a cyanamid-containing substance at a temperature above 130° F. and below 212° F. whereby to produce a non-hygroscopic granular product containing appreciable quantities of available water-insoluble nitrogen.

9. A dry fertilizer material formed by mixing alcohol distillery slop and at least 40% by weight of calcium cyanamid and heating the mixture to a temperature of between about 130° and 212° F., the product having at least 50% of its nitrogen content in active water-insoluble form.

10. A non-hygroscopic fertilizer base material including a granular product of the reaction between alcohol distillery slop and from about 40% to 50% by weight of calcium cyanamid heated to a temperature of approximately 130° F. and having at least 50% of its nitrogen content in active, water-insoluble form.

ALBERT G. STILLWELL.